United States Patent
Simpson et al.

(10) Patent No.: US 6,932,037 B2
(45) Date of Patent: Aug. 23, 2005

(54) VARIABLE CAM TIMING (VCT) SYSTEM HAVING MODIFICATIONS TO INCREASE CAM TORSIONALS FOR ENGINES HAVING LIMITED INHERENT TORSIONALS

(75) Inventors: Roger T. Simpson, Ithaca, NY (US); Philip J. Mott, Dryden, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/620,136

(22) Filed: Jul. 15, 2003

(65) Prior Publication Data

US 2004/0144348 A1 Jul. 29, 2004

Related U.S. Application Data

(60) Provisional application No. 60/443,060, filed on Jan. 28, 2003.

(51) Int. Cl.$^7$ .................................................. F01L 1/34
(52) U.S. Cl. ................. 123/90.17; 123/90.15; 123/90.31; 123/192.2
(58) Field of Search ................. 123/90.12, 90.15–90.18, 123/90.27, 90.31, 192.2; 74/568 R, 431–435, 437, 603, 604; 464/1, 2, 160; 92/121, 122

(56) References Cited

U.S. PATENT DOCUMENTS

| | | | | |
|---|---|---|---|---|
| 4,036,073 A | * | 7/1977 | Kitano | 74/393 |
| 4,685,348 A | * | 8/1987 | Takami | 74/437 |
| 4,911,032 A | * | 3/1990 | Steele et al. | 74/462 |
| 5,002,023 A | | 3/1991 | Butterfield et al. | 123/90.15 |
| 5,107,804 A | | 4/1992 | Becker et al. | 123/90.17 |
| 5,107,805 A | | 4/1992 | Butterfield et al. | 120/90.17 |
| 5,163,872 A | * | 11/1992 | Niemiec et al. | 464/2 |
| 5,172,659 A | | 12/1992 | Butterfield et al. | 123/90.17 |
| 5,184,578 A | | 2/1993 | Quinn, Jr. et al. | 123/90.17 |
| 5,289,805 A | | 3/1994 | Quinn, Jr. et al. | 123/90.17 |
| 5,361,735 A | | 11/1994 | Butterfield et al. | 123/90.17 |
| 5,363,819 A | * | 11/1994 | Venturi et al. | 123/192.2 |
| 5,419,213 A | * | 5/1995 | Karlyn et al. | 74/437 |
| 5,497,738 A | | 3/1996 | Siemon et al. | 123/90.17 |
| 5,657,725 A | | 8/1997 | Butterfield et al. | 123/90.17 |
| 5,713,092 A | * | 2/1998 | Belanger et al. | 15/53.2 |
| 5,875,752 A | * | 3/1999 | Zhao et al. | 123/192.1 |
| 5,882,025 A | * | 3/1999 | Runnels | 280/259 |
| 6,155,220 A | * | 12/2000 | Marriott | 123/90.17 |
| 6,212,967 B1 | * | 4/2001 | Nugent | 74/437 |
| 6,247,434 B1 | | 6/2001 | Simpson et al. | 123/90.17 |
| 6,250,265 B1 | | 6/2001 | Simpson | 123/90.17 |
| 6,263,846 B1 | | 7/2001 | Simpson et al. | 123/90.17 |
| 6,305,353 B1 | * | 10/2001 | Weber et al. | 123/406.58 |
| 6,311,655 B1 | | 11/2001 | Simpson et al. | 123/90.17 |
| 6,332,439 B2 | * | 12/2001 | Sekiya et al. | 123/90.17 |
| 6,374,787 B2 | | 4/2002 | Simpson et al. | 123/90.17 |
| 6,477,999 B1 | | 11/2002 | Markley | 123/90.17 |

FOREIGN PATENT DOCUMENTS

EP 325724 A * 8/1989 ............. F16D/3/14

* cited by examiner

*Primary Examiner*—Thomas Denion
*Assistant Examiner*—Jaime Corrigan
(74) *Attorney, Agent, or Firm*—Brown & Michaels, PC; Greg Dziegielewski (57) ABSTRACT

In a variable cam timing (VCT) system that has a crank shaft coupled to at least one cam shaft. The system has at least one timing gear associated with the crank shaft or a cam shaft. The timing gear includes at least two groups of toothlike projections including a first group having a first distance to the center of the wheel, and a second group having a second distance to the center of the wheel. The first distance is different from the second distance. Whereby torsional energy for torque actuated purposes is increased for the VCT system. The system may further include a resonator which is positioned upon the at least one cam shaft, the resonator including at least one mass and at least one elastic element. Whereby torsional oscillation of the at least one cam shaft at a predetermined engine speed range is increased.

13 Claims, 5 Drawing Sheets

VARIABLE CAM TIMING (VCT) SYSTEM HAVING MODIFICATIONS TO INCREASE CAM TORSIONALS FOR ENGINES HAVING LIMITED INHERENT TORSIONALS

REFERENCE TO PROVISIONAL APPLICATION

This application claims an invention which was disclosed in Provisional Application No. 60/443,060, filed Jan. 28, 2003, entitled "-CAM TORQUE ACTUATED (CTA) VARIABLE CAM TIMING (VCT) SYSTEM HAVING MIDIFICATIONS TO INCREASE CAM TORSIONALS FOR ENGINES (E.G. 4-CYLINDER) HAVING LIMITED INHERENT TORSIONALS". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of variable cam timing (VCT) systems. More particularly, the invention pertains to cam torque actuated (CTA) variable cam timing (VCT) system having modifications to increase cam torsionals for engines (e.g. 4-cylinder) having limited inherent torsionals.

2. Description of Related Art

The performance of an internal combustion engine can be improved by the use of dual camshafts, one to operate the intake valves of the various cylinders of the engine and the other to operate the exhaust valves. Typically, one of such camshafts is driven by the crankshaft of the engine, through a sprocket and chain drive or a belt drive, and the other of such camshafts is driven by the first, through a second sprocket and chain drive or a second belt drive. Alternatively, both of the camshafts can be driven by a single crankshaft powered chain drive or belt drive. Engine performance in an engine with dual camshafts can be further improved, in terms of idle quality, fuel economy, reduced emissions or increased torque, by changing the positional relationship of one of the camshafts, usually the camshaft which operates the intake valves of the engine, relative to the other camshaft and relative to the crankshaft, to thereby vary the timing of the engine in terms of the operation of intake valves relative to its exhaust valves or in terms of the operation of its valves relative to the position of the crankshaft.

Consideration of information disclosed by the following U.S. Patents, which are all hereby incorporated by reference, is useful when exploring the background of the present invention.

U.S. Pat. No. 5,002,023 describes a VCT system within the field of the invention in which the system hydraulics includes a pair of oppositely acting hydraulic cylinders with appropriate hydraulic flow elements to selectively transfer hydraulic fluid from one of the cylinders to the other, or vice versa, to thereby advance or retard the circumferential position on of a camshaft relative to a crankshaft. The control system utilizes a control valve in which the exhaustion of hydraulic fluid from one or another of the oppositely acting cylinders is permitted by moving a spool within the valve one way or another from its centered or null position. The movement of the spool occurs in response to an increase or decrease in control hydraulic pressure, $P_C$, on one end of the spool and the relationship between the hydraulic force on such end and an oppositely direct mechanical force on the other end which results from a compression spring that acts thereon.

U.S. Pat. No. 5,107,804 describes an alternate type of VCT system within the field of the invention in which the system hydraulics include a vane having lobes within an enclosed housing which replace the oppositely acting cylinders disclosed by the aforementioned U.S. Pat. No. 5,002,023. The vane is oscillatable with respect to the housing, with appropriate hydraulic flow elements to transfer hydraulic fluid within the housing from one side of a lobe to the other, or vice versa, to thereby oscillate the vane with respect to the housing in one direction or the other, an action which is effective to advance or retard the position of the camshaft relative to the crankshaft. The control system of this VCT system is identical to that divulged in U.S. Pat. No. 5,002,023, using the same type of spool valve responding to the same type of forces acting thereon.

U.S. Pat. Nos. 5,172,659 and 5,184,578 both address the problems of the aforementioned types of VCT systems created by the attempt to balance the hydraulic force exerted against one end of the spool and the mechanical force exerted against the other end. The improved control system disclosed in both U.S. Pat. Nos. 5,172,659 and 5,184,578 utilizes hydraulic force on both ends of the spool. The hydraulic force on one end results from the directly applied hydraulic fluid from the engine oil gallery at full hydraulic pressure, $P_S$. The hydraulic force on the other end of the spool results from a hydraulic cylinder or other force multiplier which acts thereon in response to system hydraulic fluid at reduced pressure, $P_C$, from a PWM solenoid. Because the force at each of the opposed ends of the spool is hydraulic in origin, based on the same hydraulic fluid, changes in pressure or viscosity of the hydraulic fluid will be self-negating, and will not affect the centered or null position of the spool.

U.S. Pat. No. 5,289,805 provides an improved VCT method which utilizes a hydraulic PWM spool position control and an advanced control algorithm that yields a prescribed set point tracking behavior with a high degree of robustness.

In U.S. Pat. No. 5,361,735, a camshaft has a vane secured to an end for non-oscillating rotation. The camshaft also carries a timing belt driven pulley which can rotate with the camshaft but which is oscillatable with respect to the camshaft. The vane has opposed lobes which are received in opposed recesses, respectively, of the pulley. The camshaft tends to change in reaction to torque pulses which it experiences during its normal operation and it is permitted to advance or retard by selectively blocking or permitting the flow of engine oil from the recesses by controlling the position of a spool within a valve body of a control valve in response to a signal from an engine control unit. The spool is urged in a given direction by rotary linear motion translating means which is rotated by an electric motor, preferably of the stepper motor type.

U.S. Pat. No. 5,497,738 shows a control system which eliminates the hydraulic force on one end of a spool resulting from directly applied hydraulic fluid from the engine oil gallery at full hydraulic pressure, $P_s$, utilized by previous embodiments of the VCT system. The force on the other end of the vented spool results from an electromechanical actuator, preferably of the variable force solenoid type, which acts directly upon the vented spool in response to an electronic signal issued from an engine control unit ("ECU") which monitors various engine parameters. The ECU receives signals from sensors corresponding to camshaft and crankshaft positions and utilizes this information to calculate a relative phase angle. A closed-loop feedback system which corrects for any phase angle error is preferably employed.

The use of a variable force solenoid solves the problem of sluggish dynamic response. Such a device can be designed to be as fast as the mechanical response of the spool valve, and certainly much faster than the conventional (fully hydraulic) differential pressure control system. The faster response allows the use of increased closed-loop gain, making the system less sensitive to component tolerances and operating environment.

U.S. Pat. No. 5,657,725 shows a control system which utilizes engine oil pressure for actuation. The system includes A camshaft has a vane secured to an end thereof for non-oscillating rotation therewith. The camshaft also carries a housing which can rotate with the camshaft but which is oscillatable with the camshaft. The vane has opposed lobes which are received in opposed recesses, respectively, of the housing. The recesses have greater circumferential extent than the lobes to permit the vane and housing to oscillate with respect to one another, and thereby permit the camshaft to change in phase relative to a crankshaft. The camshaft tends to change direction in reaction to engine oil pressure and/or camshaft torque pulses which it experiences during its normal operation, and it is permitted to either advance or retard by selectively blocking or permitting the flow of engine oil through the return lines from the recesses by controlling the position of a spool within a spool valve body in response to a signal indicative of an engine operating condition from an engine control unit. The spool is selectively positioned by controlling hydraulic loads on its opposed end in response to a signal from an engine control unit. The vane can be biased to an extreme position to provide a counteractive force to a unidirectionally acting frictional torque experienced by the camshaft during rotation.

U.S. Pat. No. 6,247,434 shows a multi-position variable camshaft timing system actuated by engine oil. Within the system, a hub is secured to a camshaft for rotation synchronous with the camshaft, and a housing circumscribes the hub and is rotatable with the hub and the camshaft and is further oscillatable with respect to the hub and the camshaft within a predetermined angle of rotation. Driving vanes are radially disposed within the housing and cooperate with an external surface on the hub, while driven vanes are radially disposed in the hub and cooperate with an internal surface of the housing. A locking device, reactive to oil pressure, prevents relative motion between the housing and the hub. A controlling device controls the oscillation of the housing relative to the hub.

U.S. Pat. No. 6, 250,265 shows a variable valve timing system with actuator locking for internal combustion engine. The system comprising a variable camshaft timing system comprising a camshaft with a vane secured to the camshaft for rotation with the camshaft but not for oscillation with respect to the camshaft. The vane has a circumferentially extending plurality of lobes projecting radially outwardly therefrom and is surrounded by an annular housing that has a corresponding plurality of recesses each of which receives one of the lobes and has a circumferential extent greater than the circumferential extent of the lobe received therein to permit oscillation of the housing relative to the vane and the camshaft while the housing rotates with the camshaft and the vane. Oscillation of the housing relative to the vane and the camshaft is actuated by pressurized engine oil in each of the recesses on opposed sides of the lobe therein, the oil pressure in such recess being preferably derived in part from a torque pulse in the camshaft as it rotates during its operation. An annular locking plate is positioned coaxially with the camshaft and the annular housing and is moveable relative to the annular housing along a longitudinal central axis of the camshaft between a first position, where the locking plate engages the annular housing to prevent its circumferential movement relative to the vane and a second position where circumferential movement of the annular housing relative to the vane is permitted. The locking plate is biased by a spring toward its first position and is urged away from its first position toward its second position by engine oil pressure, to which it is exposed by a passage leading through the camshaft, when engine oil pressure is sufficiently high to overcome the spring biasing force, which is the only time when it is desired to change the relative positions of the annular housing and the vane. The movement of the locking plate is controlled by an engine electronic control unit either through a closed loop control system or an open loop control system.

U.S. Pat. No. 6, 263,846 shows a control valve strategy for vane-type variable camshaft timing system. The strategy involves an internal combustion engine that includes a camshaft and hub secured to the camshaft for rotation therewith, where a housing circumscribes the hub and is rotatable with the hub and the camshaft, and is further oscillatable with respect to the hub and camshaft. Driving vanes are radially inwardly disposed in the housing and cooperate with the hub, while driven vanes are radially outwardly disposed in the hub to cooperate with the housing and also circumferentially alternate with the driving vanes to define circumferentially alternating advance and retard chambers. A configuration for controlling the oscillation of the housing relative to the hub includes an electronic engine control unit, and an advancing control valve that is responsive to the electronic engine control unit and that regulates engine oil pressure to and from the advance chambers. A retarding control valve responsive to the electronic engine control unit regulates engine oil pressure to and from the retard chambers. An advancing passage communicates engine oil pressure between the advancing control valve and the advance chambers, while a retarding passage communicates engine oil pressure between the retarding control valve and the retard chambers.

U.S. Pat. No. 6,311,655 shows multi-position variable cam timing system having a vane-mounted locking-piston device. An internal combustion engine having a camshaft and variable camshaft timing system, wherein a rotor is secured to the camshaft and is rotatable but non-oscillatable with respect to the camshaft is described. A housing circumscribes the rotor, is rotatable with both the rotor and the camshaft, and is further oscillatable with respect to both the rotor and the camshaft between a fully retarded position and a fully advanced position. A locking configuration prevents relative motion between the rotor and the housing, and is mounted within either the rotor or the housing, and is respectively and releasably engageable with the other of either the rotor and the housing in the fully retarded position, the fully advanced position, and in positions therebetween. The locking device includes a locking piston having keys terminating one end thereof, and serrations mounted opposite the keys on the locking piston for interlocking the rotor to the housing. A controlling configuration controls oscillation of the rotor relative to the housing.

U.S. Pat. No. 6,374,787 shows a multi-position variable camshaft timing system actuated by engine oil pressure. A hub is secured to a camshaft for rotation synchronous with the camshaft, and a housing circumscribes the hub and is rotatable with the hub and the camshaft and is further oscillatable with respect to the hub and the camshaft within a predetermined angle of rotation. Driving vanes are radially disposed within the housing and cooperate with an external surface on the hub, while driven vanes are radially disposed in the hub and cooperate with an internal surface of the housing. A locking device, reactive to oil pressure, prevents relative motion between the housing and the hub. A controlling device controls the oscillation of the housing relative to the hub.

U.S. Pat. No. 6,477,999 shows a camshaft that has a vane secured to an end thereof for non-oscillating rotation therewith. The camshaft also carries a sprocket that can rotate with the camshaft but is oscillatable with respect to the camshaft. The vane has opposed lobes that are received in opposed recesses, respectively, of the sprocket. The recesses have greater circumferential extent than the lobes to permit the vane and sprocket to oscillate with respect to one another. The camshaft phase tends to change in reaction to pulses that it experiences during its normal operation, and it is permitted to change only in a given direction, either to advance or retard, by selectively blocking or permitting the flow of pressurized hydraulic fluid, preferably engine oil, from the recesses by controlling the position of a spool within a valve body of a control valve. The sprocket has a passage extending therethrough the passage extending parallel to and being spaced from a longitudinal axis of rotation of the camshaft. A pin is slidable within the passage and is resiliently urged by a spring to a position where a free end of the pin projects beyond the passage. The vane carries a plate with a pocket, which is aligned with the passage in a predetermined sprocket to camshaft orientation. The pocket receives hydraulic fluid, and when the fluid pressure is at its normal operating level, there will be sufficient pressure within the pocket to keep the free end of the pin from entering the pocket. At low levels of hydraulic pressure, however, the free end of the pin will enter the pocket and latch the camshaft and the sprocket together in a predetermined orientation.

It is known to use oil pressure actuated variable cam phasers on intake cams in some engines. The purposes or the functions of the oil pressure actuated variable cam phasers include the improvement of the breathing of the engine to thereby increasing performance, fuel economy, or decreased emissions from the engines. A subset of engines with VCT phasers on the exhaust cam is most often used for trying to improve the exhaust gas recirculation (EGR) of the engines and thereby eliminating the EGR subsystem such as EGR valves. For this subset of engines, the phasers (i.e. exhaust phasers) are required to shift faster than ordinary phasers mounted on the intake cam. Intake cam phasers are known to be used for improvements on power output at higher engine speed ranges. For intake cam phasers, the shift timing is not as important as compared with other input phaser design considerations.

Figure 1:
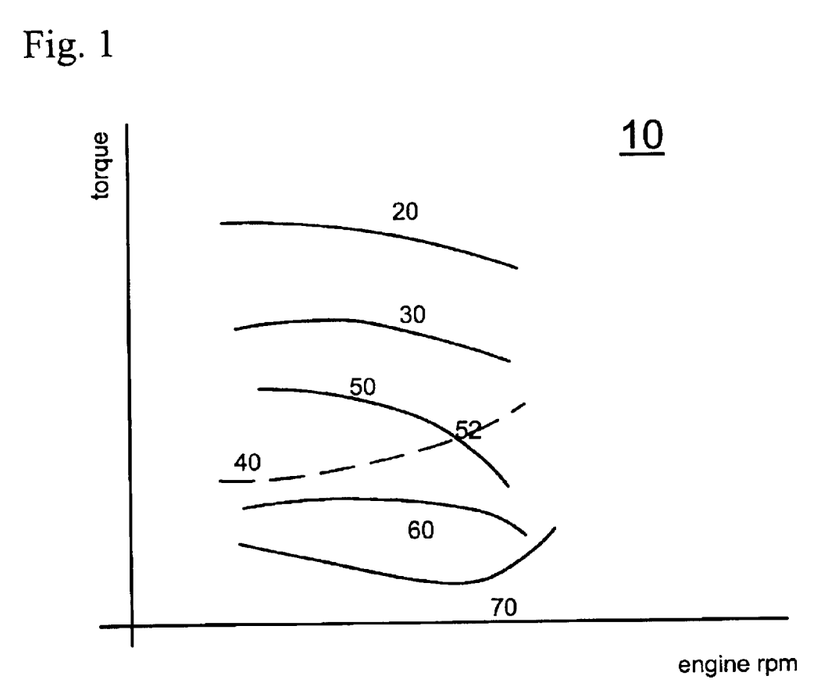
FIG. 1 shows a set of functional relationships of different types of engines' torque responses to engine speeds.

Referring to FIG. 1, a chart 10 depicts the functional relationships of different types of engines' torque responses to engine speeds. As can be seen, V8 type engines have relatively the highest torque outputs or torsionals as shown by line segment 20. for V6 engines, the torsionals is lower than V8 type engines as shown by line 30 but still above broken line segment 40 which indicates a minimum speed for a cam torque actuated (CTA) variable cam timing (VCT) system to function satisfactorily. In other words, the V8 and V6 types of engines as shown herein possess inherent torsionals, without modification, for the satisfactory functioning of cam torque actuated (CTA) variable cam timing (VCT) system.

However, for I4 type of engines, only at lower range of engine speeds can the torsionals be sufficient to function satisfactorily. As can be seen by the intersection of line segment 50 with line segment 40 at their mutual intersection point 52, when engine speeds of the I4 engine increase beyond the intersection point 52, the torsionals without modifications which is shown infra cannot produce inherently sufficient torsionals for satisfactory CTA operation.

For other types of engines including I5 type see line 60 and I6 type see line 70, both fall below broken line segment 40 thereby are unable to satisfactorily use its inherent torsionals for CTA phaser's normal performance. In other words, for some type of engines such as V6 or V8 engines, VCT systems with CTA phasers work well or produces sufficient torques.

As can be seen from FIG. 1, some type of engines such as V6 or V8 engines, CTA Phaser devices work well. The reason is that for V6 or V8 engines, the primary cam torque input comes from the $3^{rd}$ cam order, which is from the firing order. These engines also have lower maximum engine speed compared with other types of engines such as I4, I5, etc. Furthermore, for V6 or V8 engines, the $3^{rd}$ order torsional input is still very high. However, with regard to 4 cylinder engines, the primary cam torque input comes from the $4^{th}$ cam order. On a typical 4-cylinder engine this $4^{th}$ order torque input reduces to near zero levels at higher engine speeds. As a result, the effectiveness of the cam torque actuated Phaser is reduced after 3500 to 5000 RPM. One prior art approach used to over come this disadvantage is to add back in some cam torsionals by adding an extra cam lobe that will generated a torsional pulse which in turn will help power the device. This is explained in U.S. pat. No. 5,107,805, Issued Apr. 28, 1992.

The present application discloses other ways to increase the torque input in the camshaft and timing drive system of different types of engines, in which cam torque actuated (CTA) variable cam timing (VCT) phasers are used.

SUMMARY OF THE INVENTION

A set of devices is provided to increase the torque input in the camshaft and timing drive system for different types of engines, in which the increased torque is used for increasing cam torque actuated (CTA) variable cam timing (VCT) phasers.

Accordingly, in a cam torque actuated (CTA) system that has a crank shaft coupled to at least one cam shaft. The system has at least one timing gear associated with the crank shaft or a cam shaft. The timing gear includes at least two groups of toothlike projections including a first group having a first distance to the center of the wheel, and a second group having a second distance to the center of the wheel. The first distance is different from the second distance. Whereby torsional energy for torque actuated purposes is increased for the CTA system. In other words, the different diameters cause the chain to slow down and speed up thus creating the torsional energy In a cam torque actuated (CTA) system, a crank shaft is coupled to at least one cam shaft. The system includes a resonator which is positioned upon the at least one camshaft, the resonator including at least one mass and at least one elastic element. Whereby torsional oscillation of the at least one camshaft at a predetermined engine speed range is increased.

DETAILED DESCRIPTION OF THE INVENTION

Figure 2:
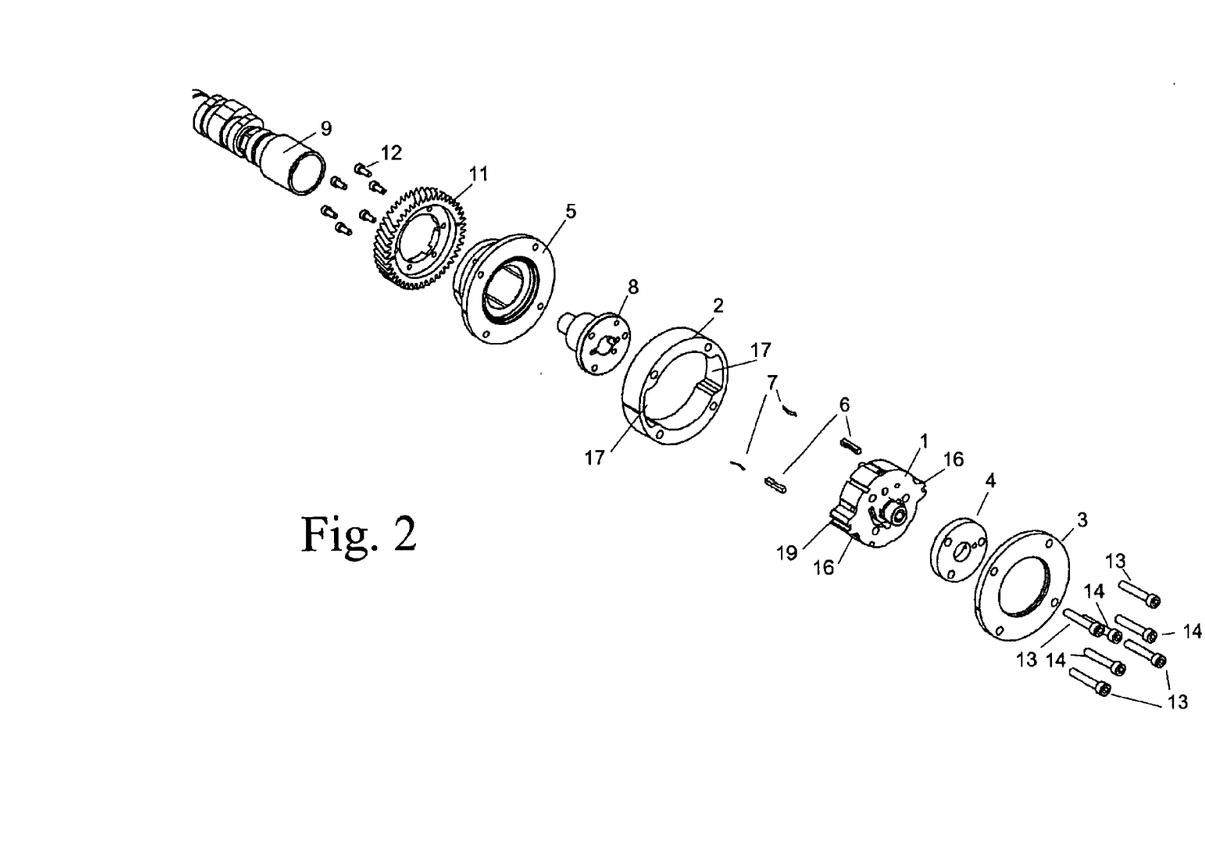
FIG. 2 shows shows a blown-up side view of the camshaft in an embodiment of the present invention.

Referring to FIG. 2, a rotor 1 is fixedly positioned on the camshaft 9, by means of mounting flange 8, to which it (and rotor front plate 4) is fastened by screws 14. The rotor 1 has a diametrically opposed pair of radially outwardly projecting vanes 16, which fit into recesses 17 in the housing body 2. The inner plate 5, housing body 2, and outer plate 3 are fastened together around the mounting flange 8, rotor 1 and rotor front plate 4 by screws 13, so that the recesses 17 holding the vanes 16, enclosed by outer plate 3 and inner plate 5, form fluid-tight chambers. The timing gear 11 is connected to the inner plate 5 by screws 12. Collectively, the inner plate 5, housing body 2, outer plate 3 and timing gear 11 will be referred to herein as the "housing". It is noted that timing gear 11 can be any gear or a sprocket, the details of which is shown in FIG. 3.

Figure 3:
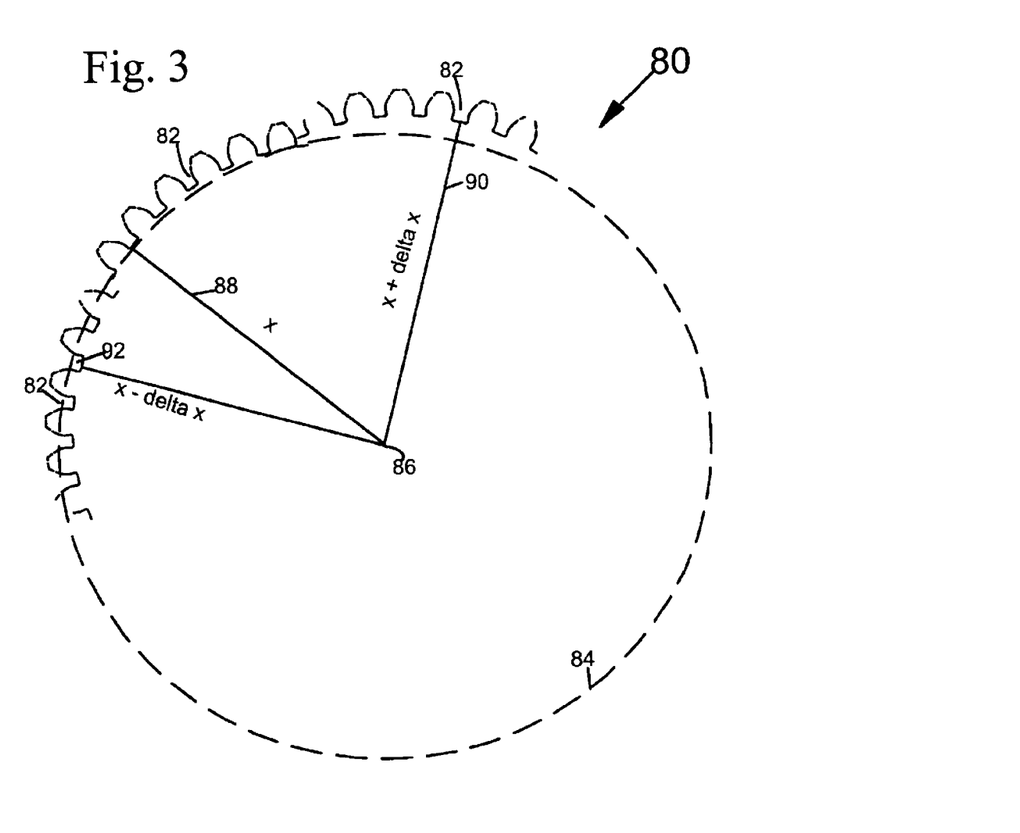
FIG. 3 shows a timing gear of the present invention.

Referring to FIG. 3, a cross sectional schematic depiction of a device 80 such as timing gear 11 of FIG. 2 is partially shown in detail. It is noted that the present invention contemplates any gear like device which has the suitable circumferential shape or structure such as depicted in the instant figure. A set of sections 82 of n teeth and grooves (only 3 shown) is provided circumferentially or on the outer edge of timing gear 11. Note that in FIG. 3, n=6, but n may be any positive integer as long as the circumference or the outer edge of device 80 has a substantially cam shape. In other words, n may be other positive integers to achieve a suitable result. Further it is noted that teeth and grooves encompass the complete circle 84 of device 80 but only 3 sets 82 are shown. The set 82 of n teeth and grooves have the following characteristics. From the center 86 of circle 84 to any groove of a set 82, at least two non-identical distances are defined. The distances can be the radius 88 of circle 82, the radius plus a first offset length 90 (e.g. x+Δx), or the radius minus a second offset length 92 (e.g. x−Δx). The first offset length 90 and the second offset length 92 can be identical or non-identical. In FIG. 3, three non-identical distances are used. They are radius 88, radius 88 plus first offset length 90, and radius 88 minus second offset length 92. But it should be noted that two non-identical distances can be used depending on the type of engine involved. For example, in I4 type internal combustion engines. The desired result is to increase the torsional energy sufficiently to drive the CTA VCT system.

Device 80 may be a sprocket. The cross section of device 80 as shown in FIG. 3 can be considered as a cam in and of itself such that different sections having non-identical distances to a point such as the center of circle 84 cause different tensions upon a timing belt or a timing chain.

One embodiment of device 80 may be a Trichoidal Sprocket. A trichoidal sprocket is a sprocket having three sections, in which each section has a non-identical distance in relation to the other two sections. In other words, trichoidal sprocket involves using a method to make either the cam or the crank sprocket out of round in three places around the circumference of the sprocket. Thereby the trichoidal sprocket introduces variations in the chain length segmentwise from side to side as the chain went around the sprocket. The introduced variation in chain length increases the torsional input to the outer diameter of the VCT Phaser. The increased torsional input, in turn, increases the response of the phaser.

It is noted that in FIG. 2, with the exception of camshaft 9, the rest of components therein may be referred to as parts constituting a phaser.

Figure 4:
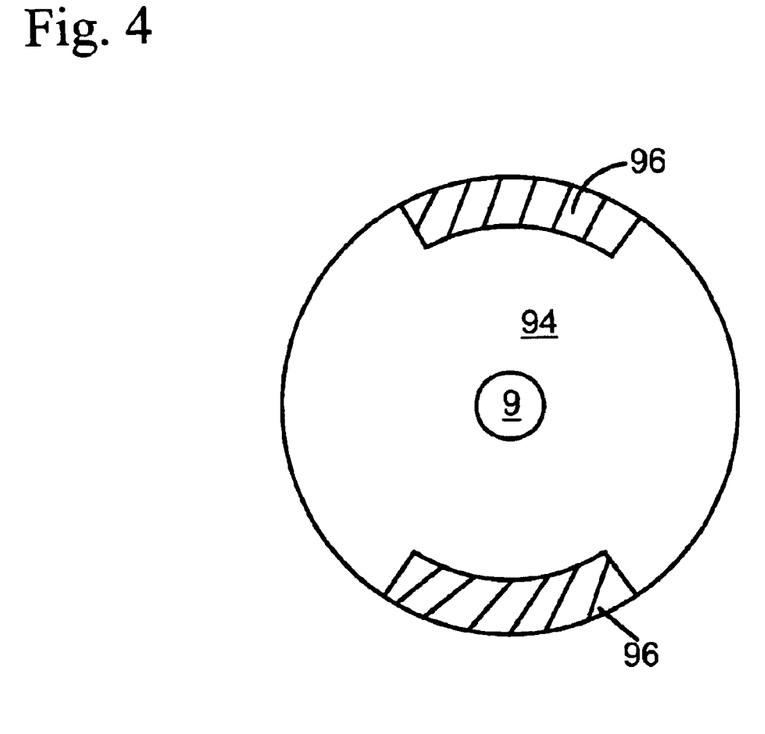
FIG. 4 shows a first embodiment of a resonator suitable for the present invention.

Referring to FIG. 4, a first embodiment of a resonator suitable for the present invention is shown. A resonator is any device that causes a second device such as a cam shaft to increase the vibrations thereof within a frequency range in the neighborhood of a system resonance frequency. Resonator can be placed anywhere on the camshaft as long as torsionals in at least one range of engine speeds can be improved. The torsionals cause desired vibrations of a mechanical system including the camshaft for suitable CTA operations. A resonator includes an elastic element and a mass. The first embodiment has an annular elective member 94 wrapped around a shaft such as cam shaft 9 of FIG. 2. A pair of high density elements 96 is affixed onto the annular member 94. Annular member 94 may be made of such materials as rubber. The high density elements may be made of such materials as metal. In other words, resonators can be made many different ways but they all will have a mass and a spring to vibrate at a predetermined frequency.

Figure 5:
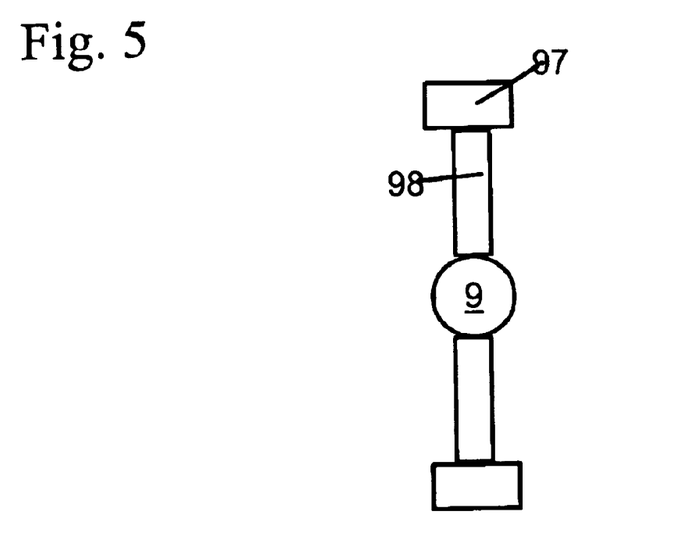
FIG. 5 shows a second embodiment of a resonator suitable for the present invention.

Referring to FIG. 5, a second embodiment of a resonator suitable for the present invention is shown. A member 97 having suitable mass 97 is coupled to a shaft such as cam shaft 9 with an elastic member 98 interposed therebetween. It is noted that a second pair of mass 97 and elastic member 98 may be provided symmetrically in relation to the shaft 9.

As can be appreciated, any known resonator is contemplated for use in the present invention in combination with the instant CTA VCT system to enhance the torsionals for suitable system operation. Therefore, other resonators with different structures than FIGS. 4 and 5 may be used in combination with the present VCT system. A typical application is used a VCT system used within or in association with an I4 engine. As can be seen by referring again to FIG. 1, line segment 50 falls below line segment 40 at higher engine speeds beyond intersection point 52. Therefore, a suitable resonator such as the ones described in FIGS. 4 and 5 may be used to increase the torsionals at higher engine speeds beyond intersection point 52. With regard to I5 and I6 type engine as represented by line segments 60 and 70 respectively, resonators can be used as well. However, with engines having characteristics line segments falling entirely below broken line segment 40, resonators used are required to increase torsionals over the entire range of the engine speed denoted by the line segment such as line segments 60 and 70. In addition, if it is desirable to increase torsionals of line segments 20 and 30 (although according to FIG. 1 they appear to posses sufficient torsionals), resonator may be used to further increase their respective torsionals. Furthermore, the resonator is tuned to a cam torsional frequency that will excite the torsional resonator to increase cam torsional energy.

In other words, pre-tuned resonator with predetermined frequency characteristics is provided for the present invention. The pre-tuned resonator combines with the camshaft for increasing the torsional oscillation of the cam at a particular speed. As the engine speed increases so does the $4^{th}$ order of the camshaft. The resonator could be pre-tuned to resonate when the cam $4^{th}$ order frequency matches the resonant frequency of the resonator. This would be appropriate at the higher engine speeds when the $4^{th}$ order cam torsional frequency is decreasing. Therefore, as the cam speed increases and the $4^{th}$ order torsional input from the cam decreases, the torsional resonator is provided that causes the $4^{th}$ order to start increasing again. This would help improve the actuation rate the CTA Phaser.

Figure 6:
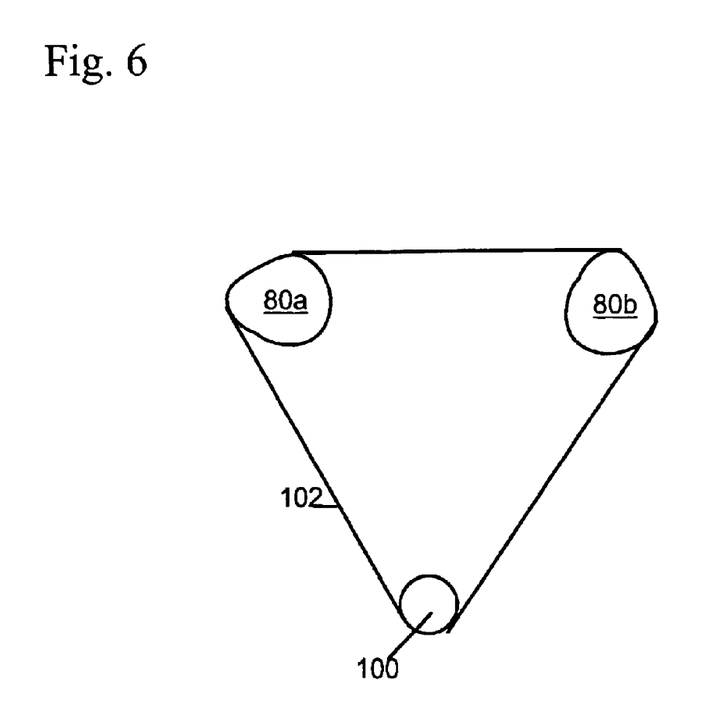
FIG. 6 shows a schematic depiction of a crankshaft engaging two camshafts.

Referring to FIG. 6, a schematic depiction of a crankshaft having a crankshaft timing gear 100 engaging two camshafts each having a cam timing gear 80a, and gear 80b respectively is shown. Crankshaft timing gear 100 may engage two more similar cam shafts (not shown) each having cam timing gear 80a, and gear 80b respectively. For example, in a V-type engine block system, two more similar cam shafts may be needed. Note the non-circular circumference contour or the outer edge shape of timing gear 80a, and gear 80b respectively. It should be noted that timing gear 100 may be of the same shape (not shown) as timing gear 80a and gear 80b to achieve the same purpose. A coupling device 102 such as a chain or a belt couples the crankshaft and the cam shafts together.

Although a trichoidal (3 lobe) shape is shown in FIG. 6, it should be noted that for some types of engines, such as I4 type, it is desirable to have a dichoidal (2 lobe, not shown) shape. The using of the 2 lobe shape is for the purpose of achieving the desired torsionals.

It is noted that the present invention also contemplates application in a Torsion Assist (TA) or Torque Assisted phaser system. In other words, the present invention contemplates the inclusion of both CTA and TA. However, it is noted that at higher speeds, the TA system can use oil pressure to help it move. IF the oil pressure was low at high speeds, then this would help a TA system.

The following are terms and concepts relating to the present invention.

It is noted the hydraulic fluid or fluid referred to supra are actuating fluids. Actuating fluid is the fluid which moves the vanes in a vane phaser. Typically the actuating fluid includes engine oil, but could be separate hydraulic fluid. The VCT system of the present invention may be a Cam Torque Actuated (CTA)VCT system in which a VCT system that uses torque reversals in camshaft caused by the forces of opening and closing engine valves to move the vane. The control valve in a CTA system allows fluid flow from advance chamber to retard chamber, allowing vane to move, or stops flow, locking vane in position. The CTA phaser may also have oil input to make up for losses due to leakage, but does not use engine oil pressure to move phaser. Vane is a radial element actuating fluid acts upon, housed in chamber. A vane phaser is a phaser which is actuated by vanes moving in chambers.

There may be one or more camshaft per engine. The camshaft may be driven by a belt or chain or gears or another camshaft. Lobes may exist on camshaft to push on valves. In a multiple camshaft engine, most often has one shaft for exhaust valves, one shaft for intake valves. A "V" type engine usually has two camshafts (one for each bank) or four (intake and exhaust for each bank).

Chamber is defined as a space within which vane rotates. Chamber may be divided into advance chamber (makes valves open sooner relative to crankshaft) and retard chamber (makes valves open later relative to crankshaft). Check valve is defined as a valve which permits fluid flow in only one direction. A closed loop is defined as a control system which changes one characteristic in response to another, then checks to see if the change was made correctly and adjusts the action to achieve the desired result (e.g. moves a valve to change phaser position in response to a command from the ECU, then checks the actual phaser position and moves valve again to correct position). Control valve is a valve which controls flow of fluid to phaser. The control valve may exist within the phaser in CTA system. Control valve may be actuated by oil pressure or solenoid. Crankshaft takes power from pistons and drives transmission and camshaft. Spool valve is defined as the control valve of spool type. Typically the spool rides in bore, connects one passage to another. Most often the spool is most often located on center axis of rotor of a phaser.

Differential Pressure Control System (DPCS) is a system for moving a spool valve, which uses actuating fluid pressure on each end of the spool. One end of the spool is larger than the other, and fluid on that end is controlled (usually by a Pulse Width Modulated (PWM) valve on the oil pressure), full supply pressure is supplied to the other end of the spool (hence differential pressure). Valve Control Unit (VCU) is a control circuitry for controlling the VCT system. Typically the VCU acts in response to commands from ECU.

Driven shaft is any shaft which receives power (in VCT, most often camshaft). Driving shaft is any shaft which supplies power (in VCT, most often crankshaft, but could drive one camshaft from another camshaft). ECU is Engine Control Unit that is the car's computer. Engine Oil is the oil used to lubricate engine, pressure can be tapped to actuate phaser through control valve.

Housing is defined as the outer part of phaser with chambers. The outside of housing can be pulley (for timing belt), sprocket (for timing chain) or gear (for timing gear). Hydraulic fluid is any special kind of oil used in hydraulic cylinders, similar to brake fluid or power steering fluid. Hydraulic fluid is not necessarily the same as engine oil. Typically the present invention uses "actuating fluid". Lock pin is disposed to lock a phaser in position. Usually lock pin is used when oil pressure is too low to hold phaser, as during engine start or shutdown.

Oil Pressure Actuated (OPA) VCT system uses a conventional phaser, where engine oil pressure is applied to one side of the vane or the other to move the vane.

Open loop is used in a control system which changes one characteristic in response to another (say, moves a valve in response to a command from the ECU) without feedback to confirm the action.

Phase is defined as the relative angular position of camshaft and crankshaft (or camshaft and another camshaft, if phaser is driven by another cam). A phaser is defined as the entire part which mounts to cam. The phaser is typically made up of rotor and housing and possibly spool valve and check valves. A piston phaser is a phaser actuated by pistons in cylinders of an internal combustion engine. Rotor is the inner part of the phaser, which is attached to a cam shaft.

Pulse-width Modulation (PWM) provides a varying force or pressure by changing the timing of on/off pulses of current or fluid pressure. Solenoid is an electrical actuator which uses electrical current flowing in coil to move a mechanical arm. Variable force solenoid (VFS) is a solenoid whose actuating force can be varied, usually by PWM of supply current. VFS is opposed to an on/off (all or nothing) solenoid.

Sprocket is a member used with chains such as engine timing chains. Timing is defined as the relationship between the time a piston reaches a defined position (usually top dead center (TDC)) and the time something else happens. For example, in VCT or VVT systems, timing usually relates to when a valve opens or closes. Ignition timing relates to when the spark plug fires.

Torsion Assist (TA) or Torque Assisted phaser is a variation on the OPA phaser, which adds a check valve in the oil supply line (i.e. a single check valve embodiment) or a check valve in the supply line to each chamber (i.e. two check valve embodiment). The check valve blocks oil pressure pulses due to torque reversals from propagating back into the oil system, and stop the vane from moving backward due to torque reversals. In the TA system, motion of the vane due to forward torque effects is permitted; hence the expression "torsion assist" is used. Graph of vane movement is step function.

VCT system includes a phaser, control valve(s), control valve actuator(s) and control circuitry. Variable Cam Timing (VCT) is a process, not a thing, that refers to controlling and/or varying the angular relationship (phase) between one or more camshafts, which drive the engine's intake and/or exhaust valves. The angular relationship also includes phase relationship between cam and the crankshafts, in which the crank shaft is connected to the pistons.

Variable Valve Timing (VVT) is any process which changes the valve timing. VVT could be associated with VCT, or could be achieved by varying the shape of the cam or the relationship of cam lobes to cam or valve actuators to cam or valves, or by individually controlling the valves themselves using electrical or hydraulic actuators. In other words, all VCT is VVT, but not all VVT is VCT.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A variable cam timing (VCT) system in an internal combustion engine having a crankshaft coupled to at least one camshaft, the cam timing system comprising:
   a phaser having a housing and a rotor, coupled to the crankshaft and at least one camshaft; and
   at least one timing sprocket associated with the crankshaft or the camshaft, and coupled to the phaser, the timing sprocket comprising at least two groups of toothlike projections including a first group having a first distance to the center of the sprocket, and a second group having a second distance to the center of the sprocket, the first distance being different from the second distance.

2. The variable cam timing system of claim 1, wherein the sprocket further comprises a third group of toothlike projections having a third unique distance to the center of the sprocket.

3. The variable cam timing system of claim 1, wherein the timing sprocket is concentrically coupled to the at least one camshaft.

4. The variable cam timing system of claim 1, wherein the timing sprocket is concentrically coupled to a crankshaft.

5. The variable cam timing system of claim 1, wherein the timing sprocket is mounted upon a phaser.

6. The variable cam timing system of claim 1, wherein the timing sprocket is engaging an engine timing chain.

7. The variable cam timing system of claim 1, wherein the timing sprocket is engaging an engine timing belt.

8. The variable cam timing system of claim 1, wherein the Variable Cam Timing (VCT) system is a cam torque actuated (CTA), an Oil Pressure Actuated (OPA), or a Torsion Assist (TA) or Torque Assisted phaser system.

9. A variable cam timing (VCT) system in an internal combustion engine having a crankshaft coupled to at least one camshaft, the variable cam timing (VCT) system comprising:
   a phaser having a housing and a rotor, coupled to the crankshaft, and at least one camshaft; and
   a resonator positioned upon the at least one camshaft the resonator including at least one mass and at least one elastic element;
   whereby torsional oscillation of the at least one camshaft at a predetermined engine speed range is increased.

10. The system of claim 9, wherein the at least one mass comprises an annular metal member.

11. The system of claims 9, wherein the at least one elastic element comprises annular rubber member attached onto the at least one camshaft.

12. The system of claim 9, wherein the at least one elastic element comprises at least one spring having a first end attached to the at least one camshaft and a second end connected to the at least one mass.

13. The system of claim 9, wherein the system is a cam torque actuated (CTA), an Oil Pressure Actuated (OPA), or a Torsion Assist (TA) or Torque Assisted phaser system.

* * * * *